(12) United States Patent
Brown

(10) Patent No.: US 10,440,943 B2
(45) Date of Patent: Oct. 15, 2019

(54) RODENT ELECTROCUTION ASSEMBLY

(71) Applicant: Scott Brown, Cannon Falls, MN (US)

(72) Inventor: Scott Brown, Cannon Falls, MN (US)

( * ) Notice: Subject to any disclaimer, the term of this patent is extended or adjusted under 35 U.S.C. 154(b) by 293 days.

(21) Appl. No.: 15/412,721

(22) Filed: Jan. 23, 2017

(65) Prior Publication Data

US 2018/0206476 A1 Jul. 26, 2018

(51) Int. Cl.
*A01M 19/00* (2006.01)
*A01M 17/00* (2006.01)

(52) U.S. Cl.
CPC ............ *A01M 19/00* (2013.01); *A01M 17/00* (2013.01)

(58) Field of Classification Search
CPC ...... A01M 17/00; A01M 19/00; A01M 23/36; A01M 23/38
USPC .......................................... 43/77–80, 98, 124
See application file for complete search history.

(56) References Cited

U.S. PATENT DOCUMENTS

| | | | | |
|---|---|---|---|---|
| 674,551 A * | 5/1901 | Carlsen | ................. | A01M 23/36 43/79 |
| 879,010 A * | 2/1908 | Schmitt | ................. | A01M 23/36 43/79 |
| 1,584,677 A * | 5/1926 | Wallis | .................... | A01M 23/30 43/78 |
| 1,602,655 A * | 10/1926 | Dorton | ................. | A01M 23/24 43/78 |
| 2,475,467 A * | 7/1949 | Alvan | .................... | A01M 23/34 43/80 |
| 2,638,700 A * | 5/1953 | Nantt | ..................... | A01M 23/36 43/80 |
| 2,700,844 A * | 2/1955 | Pastuck | ................. | A01M 23/34 43/78 |
| 3,827,176 A * | 8/1974 | Stirewalt | ............... | A01M 19/00 43/98 |
| 4,048,746 A * | 9/1977 | Dye | ...................... | A01M 19/00 43/98 |
| 4,215,429 A * | 7/1980 | Riach | ..................... | A01M 29/24 116/22 A |
| 5,191,733 A * | 3/1993 | Withrow | ............... | A01M 27/00 43/124 |
| 5,269,091 A * | 12/1993 | Johnson | ................ | A01M 23/38 43/112 |
| 5,949,636 A * | 9/1999 | Johnson | ................ | A01M 19/00 361/232 |
| 7,076,913 B1 * | 7/2006 | Dow | ..................... | A01M 27/00 43/77 |
| 7,191,735 B2 | 3/2007 | Wolfgram | | |
| 8,418,396 B2 * | 4/2013 | Moustirats | .......... | A01M 31/002 43/58 |

(Continued)

FOREIGN PATENT DOCUMENTS

WO WO9533372 12/1995

*Primary Examiner* — Darren W Ark
*Assistant Examiner* — Brady W Frazier

(57) ABSTRACT

A rodent electrocution assembly includes a housing that may be positioned on the ground thereby facilitating the housing to be aligned with a rodent tunnel. A pair of legs is provided and each of the legs is hingedly coupled to the housing. Each of the legs is urged to penetrate the ground thereby facilitating each of the legs to be positioned in the rodent tunnel. An electrifying unit is coupled to the housing. The electrifying unit is positioned in the rodent tunnel when the pair of legs is positioned in the rodent tunnel. The electrifying unit electrocutes a rodent when the rodent passes through the pair of legs.

13 Claims, 5 Drawing Sheets

(56) References Cited

U.S. PATENT DOCUMENTS

| | | | |
|---|---|---|---|
| D711,495 S | 8/2014 | Metlen et al. | |
| 2005/0044775 A1* | 3/2005 | Rich | A01M 23/38 43/98 |
| 2006/0123693 A1* | 6/2006 | Muller | A01M 23/12 43/99 |
| 2009/0193707 A1* | 8/2009 | Moran | A01M 23/16 43/58 |
| 2012/0180378 A1* | 7/2012 | Studer | A01M 23/08 43/60 |
| 2015/0320029 A1* | 11/2015 | Noe | A01M 23/38 43/98 |

\* cited by examiner

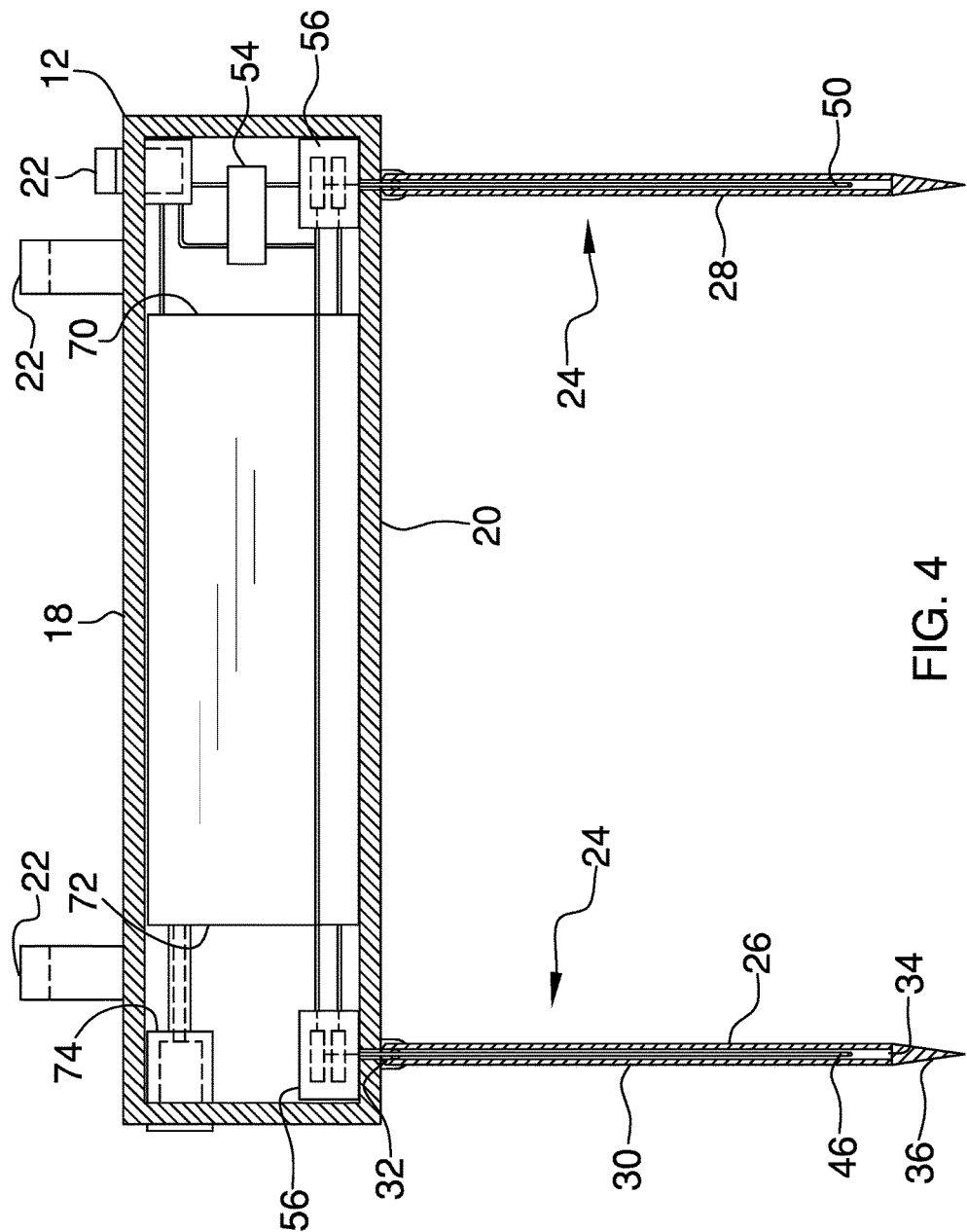

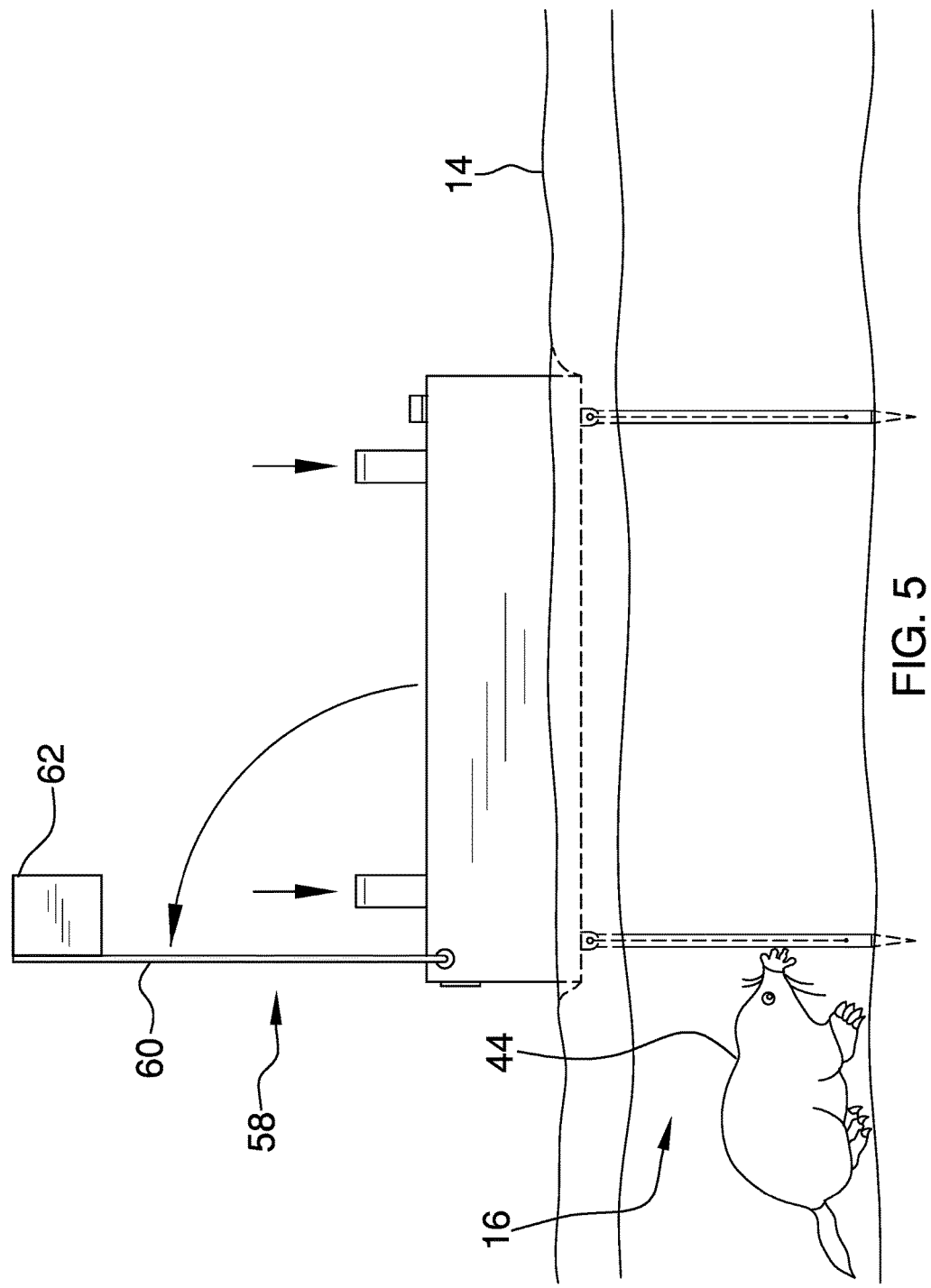

US 10,440,943 B2

RODENT ELECTROCUTION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to electrocution devices and more particularly pertains to a new electrocution device for electrocuting rodents.

BRIEF SUMMARY OF THE INVENTION

An embodiment of the disclosure meets the needs presented above by generally comprising a housing that may be positioned on the ground thereby facilitating the housing to be aligned with a rodent tunnel. A pair of legs is provided and each of the legs is hingedly coupled to the housing. Each of the legs is urged to penetrate the ground thereby facilitating each of the legs to be positioned in the rodent tunnel. An electrifying unit is coupled to the housing. The electrifying unit is positioned in the rodent tunnel when the pair of legs is positioned in the rodent tunnel. The electrifying unit electrocutes a rodent when the rodent passes through the pair of legs.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a cross sectional view taken along line 4-4 of FIG. 2 of an embodiment of the disclosure.

FIG. 5 is a perspective in-use view of an embodiment of the disclosure.

DETAILED DESCRIPTION OF THE INVENTION

Figure 1:
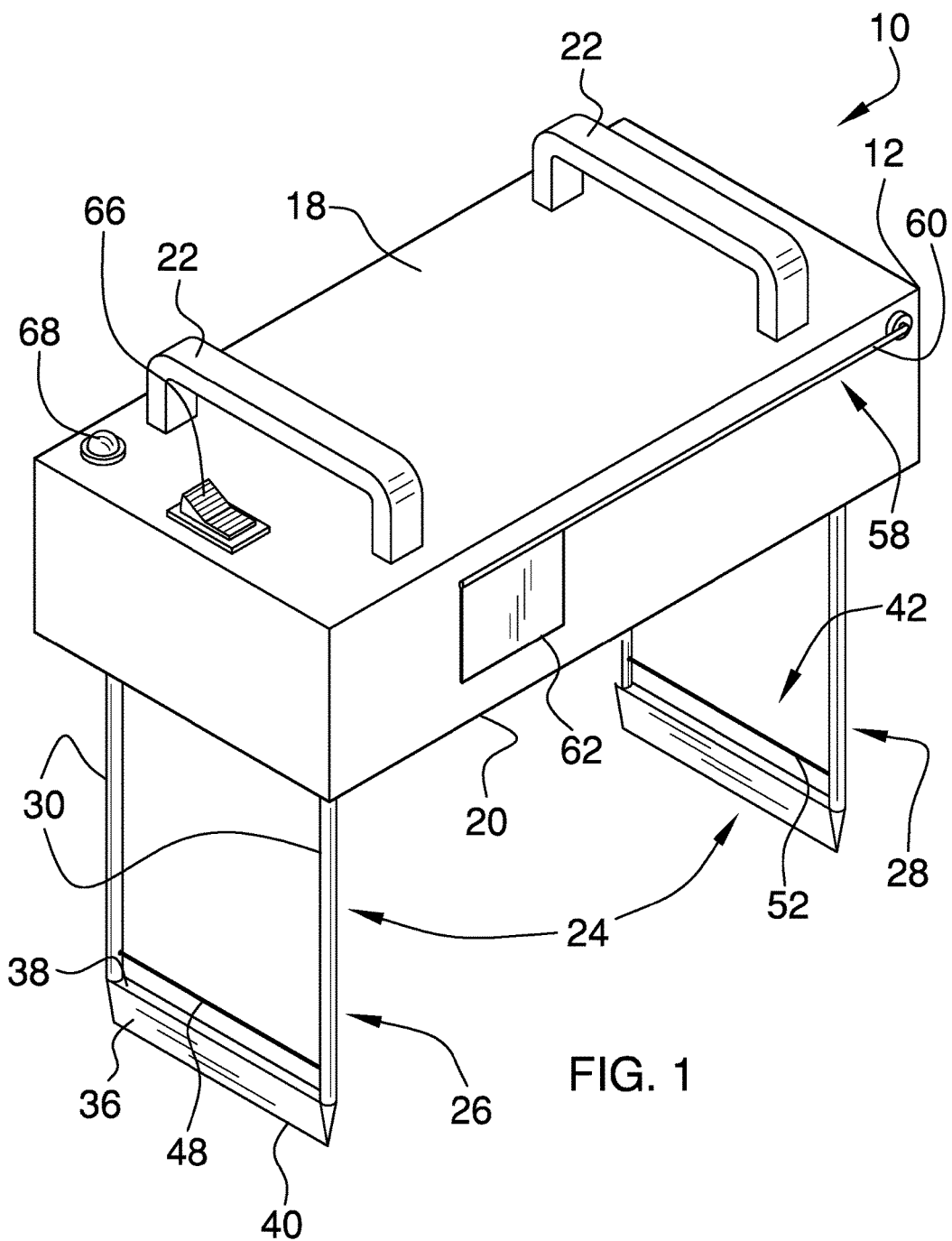
FIG. 1 is a top perspective view of a rodent electrocution assembly according to an embodiment of the disclosure.
Figure 2:
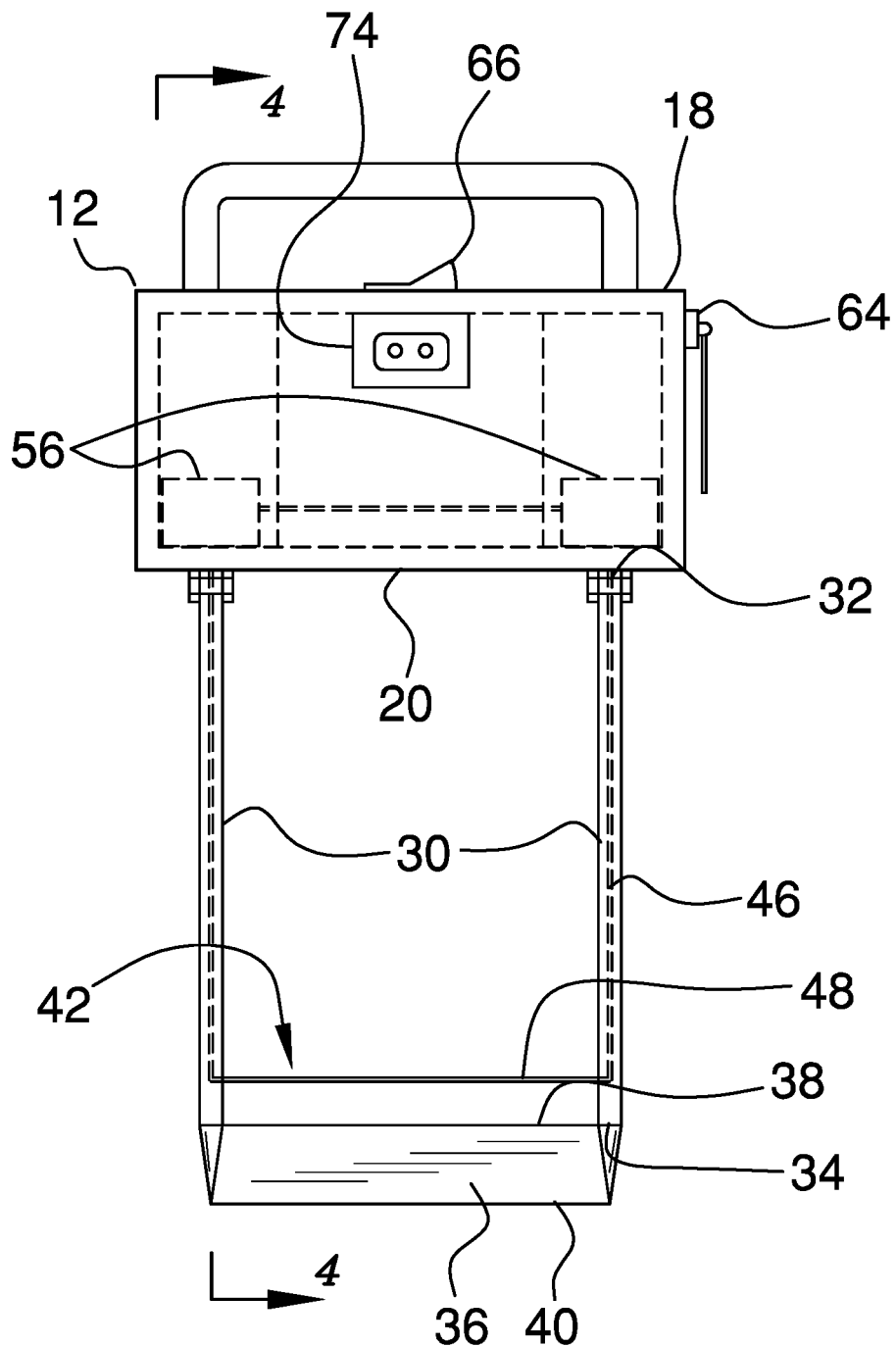
FIG. 2 is a right side view of an embodiment of the disclosure.
Figure 3:
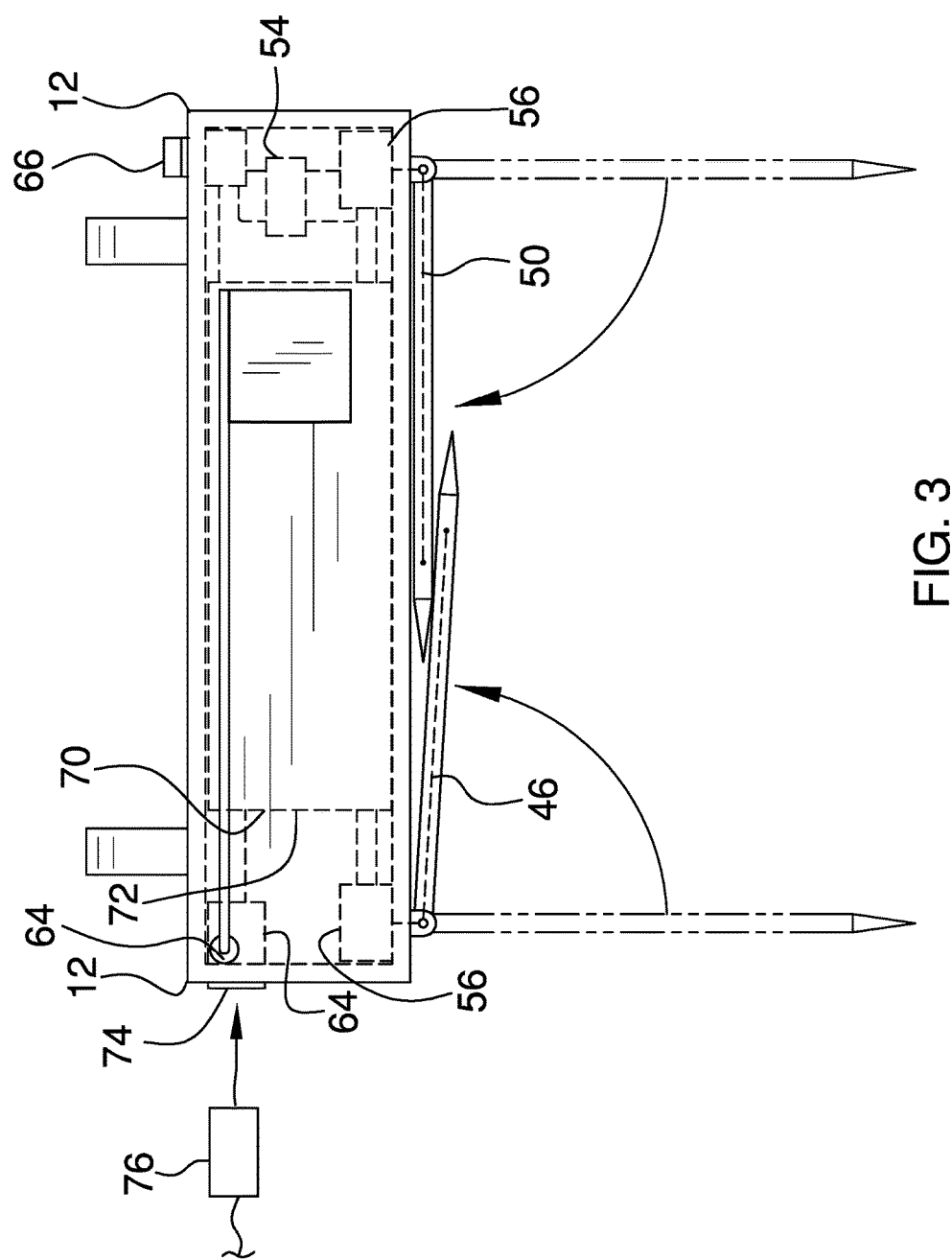
FIG. 3 is a back phantom view of an embodiment of the disclosure.

With reference now to the drawings, and in particular to FIGS. 1 through 5 thereof, a new electrocution device embodying the principles and concepts of an embodiment of the disclosure and generally designated by the reference numeral 10 will be described.

As best illustrated in FIGS. 1 through 5, the rodent electrocution assembly 10 generally comprises a housing 12 that is selectively positioned on the ground 14 thereby facilitating the housing 12 to be aligned with a rodent tunnel 16. The housing 12 has a top wall 18 and a bottom wall 20. A pair of handles 22 is provided and each of the handles 22 is coupled to the housing 12 to be gripped.

A pair of legs 24 is provided and each of the legs 24 is hingedly coupled to the housing 12. Each of the legs 24 selectively penetrates the ground 14 thereby facilitating each of the legs 24 to be positioned in the rodent tunnel 16. The pair of legs 24 includes a first leg 26 and a second leg 28. Moreover, each of the legs 24 may have a length ranging between 10.0 inches and 14.0 inches.

Each of the first leg 26 and the second leg 28 comprises a pair of tubes 30 and each of the tubes 30 has a first end 32 and a second end 34. The first end 32 corresponding to each of the tubes 30 is hingedly coupled to the bottom wall 20 of the housing 12. Moreover, the tubes 30 are spaced apart from each other. Each of the tubes 30 is selectively positioned in a deployed position having the tubes 30 extending downwardly from the housing 12. Each of the tubes 30 is selectively positioned in a folded position having each of the tubes 30 being oriented collinear with the bottom wall 20 of the housing 12.

A blade 36 is coupled to and extends between the pair of tubes 30. The blade 36 cuts through the ground 14 thereby facilitating each of the tubes 30 to extend through the ground 14. The blade 36 is aligned with the second end 34 corresponding to each of the tubes 30. The blade 36 has a top edge 38 and a bottom edge 40 and the bottom edge 40 is sharpened.

An electrifying unit 42 is coupled to the housing 12 and the electrifying unit 42 is positioned in the rodent tunnel 16 when the pair of legs 24 is positioned in the rodent tunnel 16. The electrifying unit 42 electrocutes a rodent 44 when the rodent 44 passes through the pair of legs 24. The rodent 44 may be a mole or the like and the rodent tunnel 16 may be a mole tunnel.

The electrifying unit 42 comprises a first conductor 46 that extends through each of the tubes 30 corresponding to the first leg 26. The first conductor 46 extends outwardly from each of the tubes 30 corresponding to the first leg 26. The first conductor 46 is spaced from the top edge 38 of the blade 36 corresponding to the first leg 26 to define an exposed section 48 of the first conductor 46. The exposed section 48 of the first conductor 46 is positioned in the rodent tunnel 16 when the first leg 26 penetrates the ground 14.

A second conductor 50 extends through each of the tubes 30 corresponding to the second leg 28. The second conductor 50 extends outwardly from each of the tubes 30 corresponding to the second leg 28. The second conductor 50 is spaced from the top edge 38 of the blade 36 corresponding to the second leg 28 to define an exposed section 52 of the second conductor 50. The exposed section 52 of the second conductor 50 is positioned in the rodent tunnel 16 when the second leg 28 penetrates the ground 14. Each of the first 46 and second 50 conductors comprises an unshielded metallic conductor.

A processor 54 is provided and the processor 54 is positioned within the housing 12. The processor 54 is electrically coupled to each of the first conductor 46 and the second conductor 50. The processor 54 selectively generates a shock sequence and the processor 54 may be an electronic processor 54 or the like.

A sensing circuit 56 is positioned within the housing 12 and the sensing circuit 56 is electrically coupled to the processor 54. The sensing circuit 56 senses when each of the first conductor 46 and the second conductor 50 are grounded by the rodent 44. The processor 54 generates the shock sequence when the sensing circuit 56 detects the first 46 and second 50 conductors have been grounded by the rodent 44. The sensing circuit 56 may comprise a solid state ground 14 detection circuit of any conventional design.

A flag 58 is rotatably coupled to the housing 12 and the flag 58 is selectively positioned between a signaling position and a stored position. The flag 58 includes a pole 60 and a banner 62 that is coupled to the pole 60. An actuator 64 is coupled to the housing 12 and the actuator 64 is electrically coupled to the processor 54. The actuator 64 is mechanically coupled to the pole 60. The actuator urges the flag 58 into the signaling position when the processor 54 generates the shock sequence. The pole 60 is vertically oriented and the banner 62 is spaced from the top wall 18 of the housing 12 when the flag 58 is in the signaling position. In this way the flag 58 communicates that the rodent 44 has been electrocuted.

A switch 66 is coupled to the top wall 18 of the housing 12 and the switch 66 may be manipulated. The switch 66 is electrically coupled to the processor 54 such that the switch 66 turns the processor 54 on and off. A light emitter 68 is coupled to the top wall 18 of the housing 12 to emit light outwardly from the housing 12. The light emitter 68 is electrically coupled to the processor 54 and the light emitter 68 is turned on when the processor 54 is turned on. The light emitter 68 may comprise an LED or the like.

A power supply 70 is positioned within the housing 12 and the power supply 70 is electrically coupled to the processor 54. The power supply 70 sends a sensing current through each of the first conductor 46 and the second conductor 50 when the processor 54 is turned on. The sensing circuit 56 detects a change in the sensing current when the rodent 44 grounds either of the first conductor 46 and the second conductor 50. Moreover, the processor 54 generates the shock sequence when the sensing circuit 56 detects the change in the sensing current.

The power supply 70 sends an electrocution current through each of the first conductor 46 and the second conductor 50 when the processor 54 generates the shock sequence. In this way the power supply 70 electrocutes the rodent 44 when the rodent 44 grounds either of the first conductor 46 and the second conductor 50. The sensing current may be have an amperage ranging between approximately 1.0 mA DC and 2.0 mA DC. Moreover, the sensing current is low enough to inhibit the rodent 44 from detecting the sensing current. The electrocution current may have an amperage ranging between approximately 1 amp DC and 2 amps DC. The electrocution current is high enough to instantly kill the rodent 44.

The power supply 70 comprises at least one battery 72 that is positioned within the housing 12 and the at least one battery 72 is electrically coupled to the processor 54. A charge port 74 is coupled to the housing 12 and the charge port 74 is selectively electrically coupled to a power source 76. The charge port 74 is electrically coupled to the at least one battery 72 such that the charge port 74 charges the at least one battery 72. The power source 76 may be an electrical cord that is plugged into an electrical outlet or the like.

In use, the tubes 30 corresponding to each of the pair of legs 24 is positioned in the deployed position. The handles 22 are gripped and the blade 36 corresponding to each of the legs 24 is urged downwardly through the ground 14 until each of the first conductor 46 and the second conductor 50 are positioned in the rodent tunnel 16. The switch 66 is manipulated to turn the processor 54 on and the sensing current is sent through each of the first 46 and second 50 conductors. The sensing circuit 56 detects the change in the sensing current when the rodent 44 crawls across either of the first conductor 46 and the second conductor 50. The processor 54 generates the shock sequence the power supply 70 sends the electrocution current through each of the first 46 and second 50 conductors. Thus, the rodent 44 is electrocuted and the flag 58 is urged into the deployed position to signal that the rodent 44 has been killed.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A rodent electrocution assembly being configured to be inserted into a rodent tunnel thereby facilitating a rodent to be electrocuted, said assembly comprising:
a housing being configured to be positioned on the ground thereby facilitating said housing to be aligned with a rodent tunnel;
a pair of legs, each of said legs being hingedly coupled to said housing, each of said legs being configured to penetrate the ground thereby facilitating each of said legs to be positioned in the rodent tunnel;
an electrifying unit being coupled to said housing wherein said electrifying unit is configured to be positioned in the rodent tunnel when said pair of legs is positioned in the rodent tunnel, said electrifying unit being configured to electrocute a rodent when the rodent passes through said pair of legs;
a flag being rotatably coupled to said housing, said flag being selectively positioned between a signaling position and a stored position;
a processor selectively generating a shock sequence; and
an actuator being coupled to said housing, said actuator being electrically coupled to said processor, said actuator being mechanically coupled to said flag, said actuator urging said flag into said signaling position when said processor generates said shock sequence wherein said flag is configured to communicate that the rodent has been electrocuted.

2. The assembly according to claim 1, wherein:
said housing has a bottom wall; and
said pair of legs includes a first leg and a second leg, each of said first leg and said second leg comprising a pair tubes, each of said tubes having a first end and a second end, said first end corresponding to each of said tubes being hingedly coupled to said bottom wall of said housing, said tubes being spaced apart from each other, each of said tubes being positioned in a deployed position having said tubes extending downwardly from said housing, each of said tubes being positioned in a folded position having each of said tubes being oriented collinear with said bottom wall of said housing.

3. A rodent electrocution assembly being configured to be inserted into a rodent tunnel thereby facilitating a rodent to be electrocuted, said assembly comprising:
a housing being configured to be positioned on the ground thereby facilitating said housing to be aligned with a rodent tunnel, said housing having a bottom wall;
a pair of legs, each of said legs being hingedly coupled to said housing, each of said legs being configured to penetrate the ground thereby facilitating each of said legs to be positioned in the rodent tunnel, said pair of legs including a first leg and a second leg, each of said first leg and said second leg comprising a pair tubes, each of said tubes having a first end and a second end, said first end corresponding to each of said tubes being hingedly coupled to said bottom wall of said housing, said tubes being spaced apart from each other, each of said tubes being positioned in a deployed position having said tubes extending downwardly from said housing, each of said tubes being positioned in a folded position having each of said tubes being oriented collinear with said bottom wall of said housing;
an electrifying unit being coupled to said housing wherein said electrifying unit is configured to be positioned in the rodent tunnel when said pair of legs is positioned in the rodent tunnel, said electrifying unit being configured to electrocute a rodent when the rodent passes through said pair of legs; and
a blade being coupled to and extending between said pair of tubes wherein said blade is configured to cut through the ground thereby facilitating each of said tubes to extend through the ground, said blade being aligned with said second end corresponding to each of said tubes, said blade having a top edge and a bottom edge, said bottom edge being sharpened.

4. The assembly according to claim 3, wherein said electrifying unit comprises a first conductor extending through each of said tubes corresponding to said first leg, said first conductor extending outwardly from each of said tubes corresponding to said first leg such that said first conductor is spaced from said top edge of said blade corresponding to said first leg to define an exposed section of said first conductor wherein said exposed section of said first conductor is configured to be positioned in the rodent tunnel when said first leg penetrates the ground.

5. The assembly according to claim 3, wherein said electrifying unit comprises a second conductor extending through each of said tubes corresponding to said second leg, said second conductor extending outwardly from each of said tubes corresponding to said second leg such that said second conductor is spaced from said top edge of said blade corresponding to said second leg to define an exposed section of said second conductor wherein said exposed section of said second conductor is configured to be positioned in the rodent tunnel when said second leg penetrates the ground.

6. The assembly according to claim 1, wherein said electrifying unit comprises:
a first conductor;
a second conductor; and
a processor being positioned within said housing, said processor being electrically coupled to each of said first conductor and said second conductor, said processor selectively generating a shock sequence.

7. The assembly according to claim 6, further comprising a sensing circuit being positioned within said housing, said sensing circuit being electrically coupled to said processor, said sensing circuit sensing when each of said first conductor and said second conductor are grounded by the rodent, said processor generating said shock sequence when said sensing circuit detects said first and second conductors have been grounded by the rodent.

8. The assembly according to claim 6, further comprising a switch being coupled to said top wall of said housing wherein said switch is configured to be manipulated, said switch being electrically coupled to said processor such that said switch turns said processor on and off.

9. The assembly according to claim 6, further comprising a light emitter being coupled to said top wall of said housing wherein said light emitter is configured to emit light outwardly from said housing, said light emitter being electrically coupled to said processor, said light emitter being turned on when said processor is turned on.

10. The assembly according to claim 6, further comprising a power supply being positioned within said housing, said power supply being electrically coupled to said processor, said power supply sending a sensing current through each of said first conductor and said second conductor when said processor is turned on, said power supply sending an electrocution current through each of said first conductor and said second conductor when said processor generates said shock sequence wherein said power supply is configured to electrocute the rodent.

11. The assembly according to claim 10, wherein said power supply comprises at least one battery being positioned within said housing, said at least one battery being electrically coupled to said processor.

12. The assembly according to claim 11, further comprising a charge port being coupled to said housing wherein said charge port is configured to be selectively electrically coupled to a power source, said charge port being electrically coupled to said at least one battery such that said charge port charges said at least one battery.

13. A rodent electrocution assembly being configured to be inserted into a rodent tunnel thereby facilitating a rodent to be electrocuted, said assembly comprising:
    a housing being configured to be positioned on the ground thereby facilitating said housing to be aligned with a rodent tunnel, said housing having a top wall and a bottom wall;
    a pair of handles, each of said handles being coupled to said housing wherein each of said handles is configured to be gripped;
    a pair of legs, each of said legs being hingedly coupled to said housing, each of said legs being configured to penetrate the ground thereby facilitating each of said legs to be positioned in the rodent tunnel, said pair of legs including a first leg and a second leg, each of said first leg and said second leg comprising:
        a pair of tubes, each of said tubes having a first end and a second end, said first end corresponding to each of said tubes being hingedly coupled to said bottom wall of said housing, said tubes being spaced apart from each other, each of said tubes being positioned in a deployed position having said tubes extending downwardly from said housing, each of said tubes being positioned in a folded position having each of said tubes being oriented collinear with said bottom wall of said housing, and
        a blade being coupled to and extending between said pair of tubes wherein said blade is configured to cut through the ground thereby facilitating each of said tubes to extend through the ground, said blade being aligned with said second end corresponding to each of said tubes, said blade having a top edge and a bottom edge, said bottom edge being sharpened; and
    an electrifying unit being coupled to said housing wherein said electrifying unit is configured to be positioned in the rodent tunnel when said pair of legs is positioned in the rodent tunnel, said electrifying unit being configured to electrocute the rodent when the rodent passes through said pair of legs, said electrifying unit comprising:
        a first conductor extending through each of said tubes corresponding to said first leg, said first conductor extending outwardly from each of said tubes corresponding to said first leg such that said first conductor is spaced from said top edge of said blade corresponding to said first leg to define an exposed section of said first conductor wherein said exposed section of said first conductor is configured to be positioned in the rodent tunnel when said first leg penetrates the ground,
        a second conductor extending through each of said tubes corresponding to said second leg, said second conductor extending outwardly from each of said tubes corresponding to said second leg such that said second conductor is spaced from said top edge of said blade corresponding to said second leg to define an exposed section of said second conductor wherein said exposed section of said second conductor is configured to be positioned in the rodent tunnel when said second leg penetrates the ground,
    a processor being positioned within said housing, said processor being electrically coupled to each of said first conductor and said second conductor, said processor selectively generating a shock sequence,
    a sensing circuit being positioned within said housing, said sensing circuit being electrically coupled to said processor, said sensing circuit sensing when each of said first conductor and said second conductor are grounded by the rodent, said processor generating said shock sequence when said sensing circuit detects said first and second conductors have been grounded by the rodent,
    a flag being rotatably coupled to said housing, said flag being selectively positioned between a signaling position and a stored position,
    an actuator being coupled to said housing, said actuator being electrically coupled to said processor, said actuator being mechanically coupled to said flag, said actuator urging said flag into said signaling position when said processor generates said shock sequence wherein said flag is configured to communicate that the rodent has been electrocuted,
    a switch being coupled to said top wall of said housing wherein said switch is configured to be manipulated, said switch being electrically coupled to said processor such that said switch turns said processor on and off,
    a light emitter being coupled to said top wall of said housing wherein said light emitter is configured to emit light outwardly from said housing, said light emitter being electrically coupled to said processor, said light emitter being turned on when said processor is turned on, and
    a power supply being positioned within said housing, said power supply being electrically coupled to said processor, said power supply sending a sensing current through each of said first conductor and said second conductor when said processor is turned on, said power supply sending an electrocution current through each of said first conductor and said second conductor when said processor generates said shock sequence wherein said power supply is configured to electrocute the rodent, said power supply comprising:
        at least one battery being positioned within said housing, said at least one battery being electrically coupled to said processor, and
        a charge port being coupled to said housing wherein said charge port is configured to be selectively electrically coupled to a power source, said charge port being electrically coupled to said at least one battery such that said charge port charges said at least one battery.

* * * * *